United States Patent [19]

Slattery et al.

[11] Patent Number: 4,891,741
[45] Date of Patent: Jan. 2, 1990

[54] AC/DC CONVERTERS

[75] Inventors: Daniel T. Slattery, Duncton; Jeremy D. Watson, Worthing, both of England

[73] Assignee: SSD Limited, West Sussex, England

[21] Appl. No.: 203,991
[22] PCT Filed: Dec. 10, 1986
[86] PCT No.: PCT/GB86/00755
§ 371 Date: Aug. 10, 1988
§ 102(e) Date: Aug. 10, 1988
[87] PCT Pub. No.: WO87/03752
PCT Pub. Date: Jun. 18, 1987

[30] Foreign Application Priority Data

Dec. 10, 1985 [GB] United Kingdom ............ 8530402
Jan. 22, 1986 [GB] United Kingdom ............ 8601512

[51] Int. Cl.⁴ ............................................. H02J 3/36
[52] U.S. Cl. ........................................ 363/35; 363/129
[58] Field of Search .................... 363/35, 37, 85, 87, 363/88, 128, 129

[56] References Cited

U.S. PATENT DOCUMENTS 4,315,305 2/1982 Siemon .................................. 363/88
4,393,442 7/1983 Kahkipuro ............................ 363/87
4,409,648 10/1983 Kobari et al. ....................... 363/87
4,468,724 8/1984 Omae et al. ......................... 363/88
4,490,780 12/1984 Nondahl .............................. 363/129

FOREIGN PATENT DOCUMENTS 0119380 9/1984 European Pat. Off. ............ 363/129

Primary Examiner—Peter S. Wong
Attorney, Agent, or Firm—Pollock, Vande Sande & Priddy

[57] ABSTRACT

A polyphase AC/DC converter, useful as a drive for a DC motor or in a power-sharing electrical power distribution system, comprises a naturally-commutated, phase-controlled, polyphase thyristor bridge and control determining the application of firing signals to the thyristors and operable in the inversion mode of the bridge to transfer conduction of load current between phases at the conventional inversion limit defined as radians advanced from the rectification limit of the bridge, but to operate an extended control range when there is zero load current at the time when the conventional inversion limit would otherwise be applied. In a DC motor drive application, a power increase of up to 15% is obtainable by specification of a higher rated DC motor voltage, and in a power-sharing electrical power distribution system, a similar increase in power transmission may be obtainable.

9 Claims, 6 Drawing Sheets

3 PHASE SUPPLY

ARMATURE TERMINAL VOLTAGE ($V_A$)

$I_a$

R

L

Back emf E $V_A = E + I_a R$

AC/DC CONVERTERS

FIELD OF THE INVENTION

This invention generally concerns improvements in or relating to AC/DC converters for interchanging electrical energy between AC and DC circuits. The invention will be described hereinafter with particular reference to polyphase rectifier drives for DC motors which employ naturally-commutated phase-controlled thyristor circuits to determine the armature current of the motor, but the invention is susceptible of wider application (for example in power-sharing electrical power distribution systems) and has application also to circuits employing controlled rectifier devices other than thyristors and to circuits wherein forced commutation is utilized rather than natural commutation. As employed herein the term AC/DC converter is intended to embrace DC to AC converters as well as AC to DC converters.

BACKGROUND OF THE INVENTION

DC motor drives are utilized in industry to serve a wide variety of purposes and commonly employ an AC to DC phase-controlled thyristor converter for controlling the motor. The converter, through the controlled switching of thyristors, changes the AC supply voltage to a controllable DC output voltage which is applied to the armature windings of the motor. By use of thyristors, commutation (that is the transfer of current from one thyristor to another and hence from one phase of the supply to the next phase) is achieved naturally in that the polyphase AC supply waveforms are responsible for turning off a conducting thyristor in much the same way as a similar circuit of diodes would behave and no special or additional circuitry is required for the commutation process; such commutation is known in the art as natural or line commutation. Thyristor AC/DC converters are therefore relatively simple in principle, though complex circuitry is commonly employed for controlling thyristor ignition, and are widely utilised in many industrial fields.

FIG. 1 of the accompanying drawings is a schematic illustration of a conventional three-phase, phase-controlled, naturally-commutated thyristor bridge, shown typically with a DC motor load. As is well known, control circuitry (which has been omitted from FIG. 1) is employed for providing triggering signals to the thyristors in the bridge at defined time instances in the waveforms of the three phases of the AC supply to determine the signed magnitude of the DC output provided to the motor M. Such control circuitry is commonly sophisticated and might, for example, employ algorithms running in microprocessors, phase locked loops, etc., as is disclosed, for example, in the book "Thyristor DC Drives" by Paresh C. San (published by John Wiley & Sons in 1981).

The circuit of FIG. 1 is known as a full converter in that the motor terminal voltage can be reversed, in dependence upon the triggering of the thyristors, so that the thyristor converter operates in a so-called inversion mode in which power can be transferred from the motor back through the thyristor bridge and into the AC supply. By virtue of this facility, regenerative braking can be accomplished in a controlled manner by means of the illustrated circuit, with the kinetic energy of a drive system coupled to the DC motor being converted into electrical energy by the motor and returned through the thyristor bridge to the AC supply. The circuit of FIG. 1 thus is useful as a controller for a DC motor which enables the motor speed and torque to be precisely determined in forward and in reverse operation of the motor, enabling the motor to be effectively and controllably braked by regeneration.

The bridge arrangement shown in FIG. 1 provides for control only in two quadrants in the armature current/back emf domain. FIG. 2 of the accompanying drawings shows this domain, and it will be readily appreciated by those skilled in the art that control is possible only in the first two quadrants with the circuit of FIG. 1. To achieve full four quadrant control, dual converters in which a similar but oppositely connected thyristor bridge is additionally connected across the motor terminals are used and enable the motor current as well as its terminal voltage to be reversed. Dual converters are widely used in industry to control reversible drives in sheet metal rolling mills, in papermaking machinery, in cablemaking and wire drawing machinery, etc.

Current understanding of the control range of phase controlled, three-phase, six-pulse, thyristor converters has set certain limits beyond which loss of current control may be expected. In practice, these restrictions lead to motor derating through compromising the regenerative voltage span, as will be explained hereinafter. It is without question that the three-phase, six-pulse, fully-controlled, naturally-commutated, phase-controlled thyristor bridge used in conjunction with separately excited direct current machines (in two quadrant and four quadrant control) has provided the mainstay of variable speed (and torque) control to industry. To achieve good control characteristics of torque (motor armature current) and speed, a complete understanding of the highly nonlinear sampled data performance of the thyristor stack is required, and there is confusion in the minds of many users relating to the specification of motor armature voltage, in that it is different for non-regenerative and regenerative applications. It is thus customary to specify armature voltages (at full speed) differently for non-regenerative and regenerative drive applications. Indeed, in Europe, this is actually defined by DIN standards (DIN 40030). Also of great significance is the variable defined as E, namely, motor armature back emf. The variable E is directly proportional to speed, and is sign dependent upon direction of rotation (assuming constant field flux). The motor manufacturer will commonly quote armature terminal voltage on the machine name plate, but the converter designer is also particularly interested in the back emf E, which is of great importance.

Conventionally, the control range of a naturally-commutated, thyristor, phase controlled polyphase bridge as shown in FIG. 1 has been considered to be limited to $\pi$ radians electrical, and it has been conventional to design the thyristor switching control circuitry to ensure operation within this limitation. FIG. 3 of the accompanying drawings shows the sinusoidal envelope of the per phase line-to-line potential of the polyphase AC supply, and marked in FIG. 3 are the lower phase limit or rectification limit for control of the relevant thyristor of the bridge and the upper phase limit or inversion limit spaced from the rectification limit by $\pi$ radians. The rectification limit represents the condition which would be achieved if the thyristors were simply replaced by diodes, and corresponds to the cross-over point in the waveform of one phase of the AC supply with the waveform of the next adjacent phase; it can be defined as the phase value beyond which further advance would produce no increase in output power into a resistive load and, for a three phase supply, would produce an average output voltage $V_{AVE}$ equal to $V_{LL}\sqrt{2} \times 3/\pi$ where $V_{LL}$ is the rms line-to-line voltage. The inversion limit has been defined as being $\pi$ radians electrical retarded from the rectification limit, since beyond this point commutation will not successfully transfer conduction from the present phase to the next, which may result in a catastrophic let-through to the load and loss of control.

Consequently, it has not been the practice to operate fully-controlled, three-phase, naturally-commutated, thyristor DC motor drives in an inversion mode at thyristor firing phases beyond the inversion limit.

When operating in a regenerative braking inversion mode, control of a DC motor by phase control of a thyristor bridge as hereinabove described is possible only so long as the back emf of the motor (which is sign dependent upon the direction of rotation of the motor, assuming constant field flux) is no greater than the maximum voltage available at the motor terminals from the thyristor bridge. If the back emf developed by the motor exceeds the thyristor bridge output, then all possibilities for control will be lost, with consequent risk of catastrophic failure as control of current is lost. The inversion limit restricts the control possibilities which are available, and in consequence of this DC motors controlled by such thyristor bridges have to be correspondingly de-rated.

The conventionally set inversion limit corresponds to the need to transfer conduction between two phases of the AC supply before the commutating thyristor bias becomes such that it is no longer possible to transfer load current to the commutating thyristor in sequence in order to maintain proper control of the load current; in practice, circuit impedance necessitates a forward displacement of this limit to provide a sufficient volt-second margin to ensure reliable commutation under all reactive supply conditions.

A factor of safety is therefore commonly introduced by defining a so-called inversion end stop. The inversion end stop is commonly phase advanced from the inversion limit by as much as 15° or even more. The phase displacement between the end stop and the inversion limit is determined in dependence upon the inductance of the supply and the amount of current to be commutated. The introduction of such an end stop effectively reduces the maximum available control range from 180° ($\pi$ radians) to for example 165°. It is the intersection of the end stop and the instantaneous voltage that sets the maximum value of motor back emf into which a controlled amount of current can be achieved.

The result of these compromises is an increase in motor costs due to the non-standard requirements of the armature voltage and a further increase in costs as a result of the required increase in current capacity.

In mainland Europe, the three-phase industrial supply is 380 volts rms, and in the UK it is 415 volts rms. According to DIN standards (in mainland Europe), an armature terminal voltage of 460 volts is defined. This value may be achieved by consideration of the fact that the maximum average (DC) output voltage obtainable from a three-phase, fully-controlled bridge at fully rectification from a 380 $V_{AC}$ supply is:

$$V_{DC}(\text{average}) = \frac{3}{\pi} \sqrt{2} \ V_{AC}(rms) = 513 \text{ Volts}$$

where throughout phase-to-phase voltages are used and allowing for supply tolerances of 10%, this gives $V_{DC}=460$ V under worst case conditions. On UK supplies, $V_{DC}$ is equal to 500 V under worst case conditions, but it is not uncommon to find UK standards as 490, 480 and 460 volts DC, which causes confusion and non-standardization of DC motors.

SUMMARY OF THE INVENTION

Accordingly, a first object of the present invention is to enable motor voltage specifications to be maximized, particularly in the regenerative operating mode, by an observation of load conditions which observed, when observed, allow a wider control range than is currently used.

More generally, the object of the invention is to improve the efficiency of AC/DC converters for interchanging electrical energy between AC and DC circuits.

A more particular object of the invention is to control the operation of controlled rectifier devices in a polyphase AC/DC converter bridge circuit so that commutation within the circuit is optimized during inversion mode operation for optimizing energy transfer between the AC and DC circuits.

Yet another object of the present invention is to extend the controllability of DC motors operating in a regenerative braking mode.

Another object of the invention is to improve the efficiency of power-sharing electrical power distribution systems utilizing AC/DC converters at remote ends of a DC power transmission link.

The present invention resides in the realization that the conventional inversion limit need not be observed under circumstances where zero current flows in the thyristor bridge and the load at the relevant time. Under such conditions, the inversion limit may be ignored. For a polyphase system, the extended control range can be located up to a further $\pi/2p$ radians retarded from the conventional inversion limit, where $p \geq 3$ represents the number of phases. By virtue of this extension of the control range, an increased inversion potential availability is obtained which enables the motor armature voltage specification to be increased and, for the same armature current, permits a typical 15% increase in power to be obtained by the use of a higher rated motor for the same rated current.

According to one aspect of the present invention, therefore, there is provided a polyphase AC/DC converter comprising commutating controlled rectifier devices wherein the conventional inversion limit (as hereinbefore defined) for phase transfer need not be observed under conditions of instantaneous zero load current, and an extended control range limit located within a further $\pi/2p$ radians of the conventional inversion limit may instead be observed.

According to a preferred embodiment of the present invention, there is provided a polyphase AC/DC converter comprising a naturally-commutated, phase-controlled, polyphase, thyristor bridge, and control means operative when in the inversion mode of the bridge to inhibit phase transfer at the conventional inversion limit (as hereinbefore defined) in response to a zero converter load current situation prevailing at the respective time, and to allow an extended control range by delaying phase transfer for a predetermined further limited period while maintaining control.

The present invention may also be applicable to a power-sharing electrical power distribution system comprising a first naturally-commutated, phase-controlled, polyphase, thyristor AC/DC converter at a first location, said first AC/DC converter being coupled to a first polyphase AC power system and to a DC link, and a second naturally-commutated phase-controlled, polyphase, thyristor AC/DC converter at a second location remote from said first location, said second AC/DC converter being coupled to a second polyphase AC power system and to said DC link, each of said first and second converters being arranged such that the conventional inversion limit (as hereinbefore defined) for phase transfer need not be observed under conditions of instantaneous zero load current, and an extended control range limit may instead be observed. Similar systems within the ambit of the present invention might employ controlled rectifier devices other than thyristors, and might employ such devices in forced commutation circuits.

Other features, aspects and advantages of the present invention are set forth with particularity in the appended claims and will become well understood by those possessed of relevant skills from consideration of the following specific description, given with reference to the accompanying drawings.

DESCRIPTION OF PREFERRED EMBODIMENT

Figure 1:
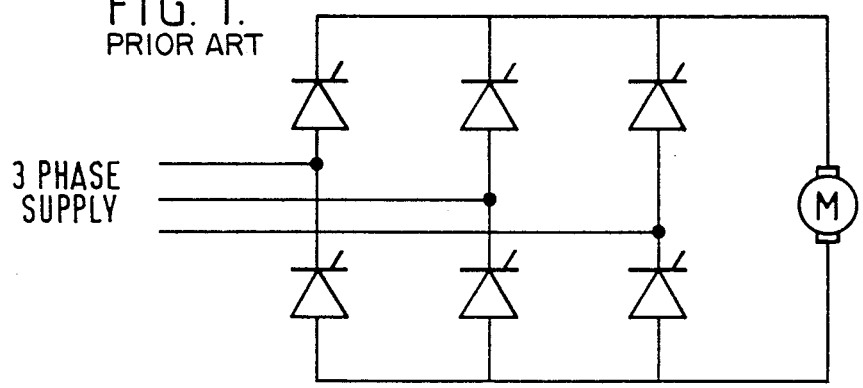
FIG. 1 is a schematic representation of an AC/DC converter bridge circuit comprising controlled rectifier devices such as thyristors.
Figure 4:
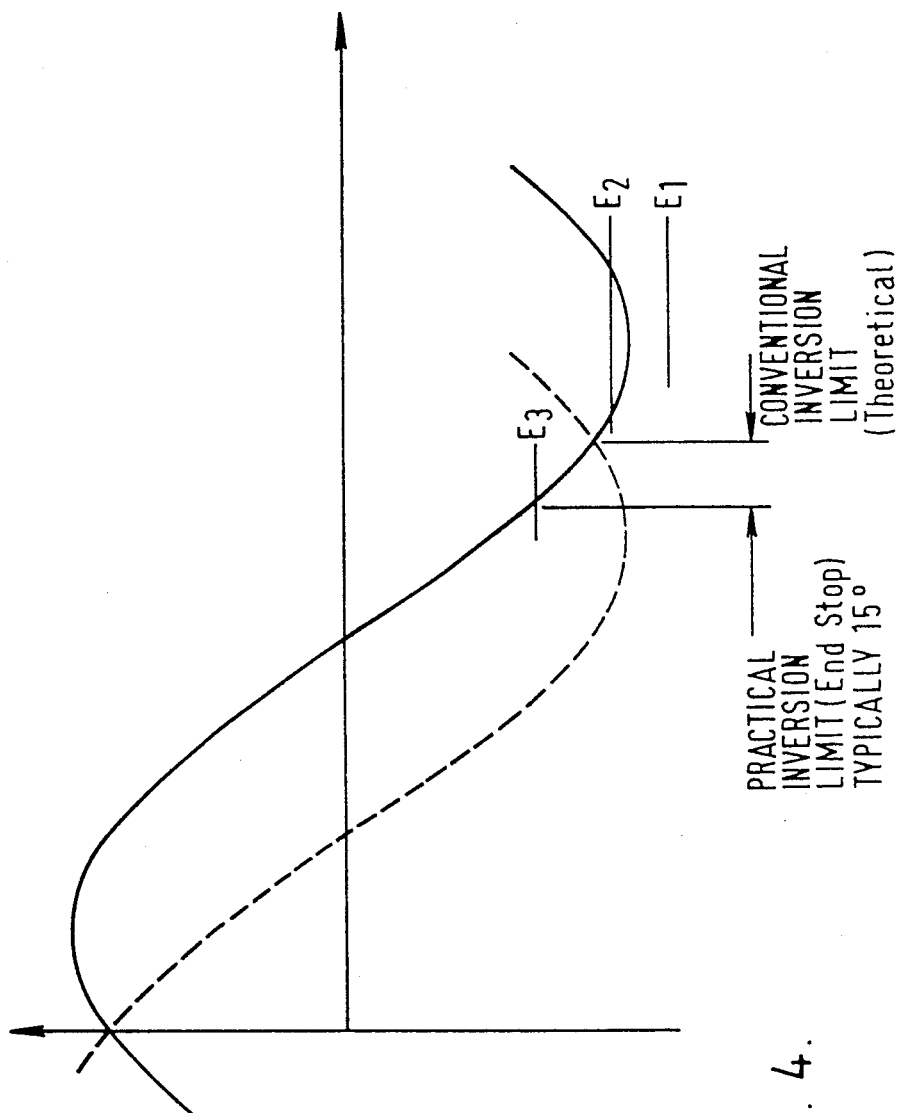
FIG. 4 shows the sinusoidal envelope of one phase of a three-phase AC supply.

As shown in FIG. 4 of the accompanying drawings the sinusoidal envelope shown in full line represents the lines-to-line potential for one phase of a 3-phase AC supply to a thyristor bridge as in FIG. 1, and the broken line represents the preceding phase. To understand the reason for the conventional differences in specified armature voltage, it is necessary to explore the reasoning in more detail.

Consider a portion of the 3-phase supply as illustrated in FIG. 4; since all phases are identical, only one need be considered, remembering that phase-to-phase potentials are shown. The rectification limit is defined as the maximum phase advance of the firing point beyond which the output voltage (DC) will not increase and the thyristor bridge becomes in effect a diode bridge, thus $$VDC = \frac{3}{\pi} \sqrt{2} \ VAC \ RMS$$

and the inversion limit is defined as the maximum phase retard allowed, such that commutation (transfer from phase to following phase) during inversion can always occur, failure to commutate being a fault condition. Put simply, if conduction is occurring on the phase illustrated, then unless conduction is transferred to the following phase before the inversion limit, the conducting phase will swing positive and initiate large amounts of uncontrolled current.

Since the 3-phase supply is always inductive at supply frequencies, it requires time (volt seconds) to reduce the phase current from its instantaneous value of armature current to zero, while at the same time increasing the incoming phase current from zero to the armature current value, assuming that the armature current is substantially constant. Hence, in practice, it is necessary for safe operation to define an inversion end stop which is phase advanced from the inversion limit, rather than let the maximum phase retard be the inversion limit.

While the theoretical control range can be seen to be 180° ($\pi$) electrical, a typical endstop can be positioned 15° advanced, thus giving a control range of 165°.

With the thyristor bridge operating in its inversion mode and the DC motor subject to regenerative braking, for continuity of control the transfer of control from the broken line phase to the full line phase would conventionally be effected at the cross-over point of the two phases or, as aforementioned, shortly therebefore, this point representing the conventional inversion limit. In accordance with the present invention, this conventional procedure is followed except when load current is zero at the time when the thyristors in the bridge would conventionally commutate to transfer control, in which case thyristor control transfer is not effected at the conventional inversion limit, but is delayed for up to a further $\pi/6$ radians. The solution to the prior art problems is thus to identify the largest firing angle which will produce a controlled flow of current, however small.

Figure 6:
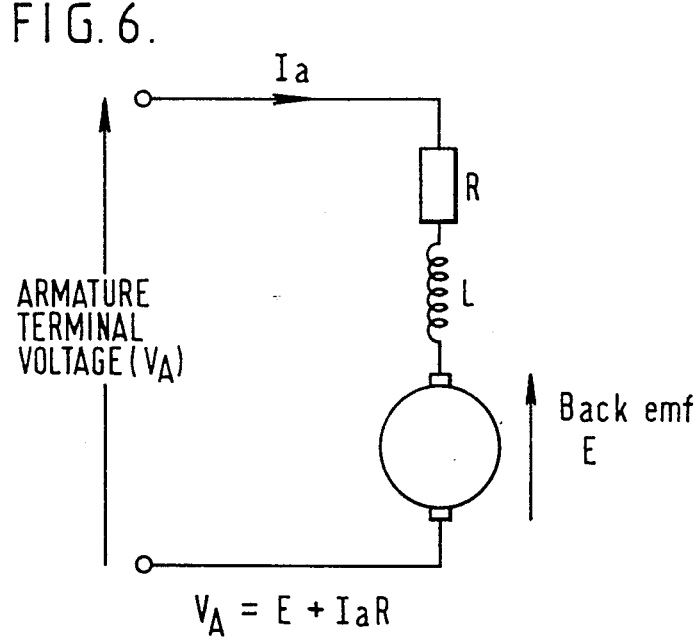
FIG. 6 is a schematic showing of the voltages associated with a DC motor.
Figure 2:
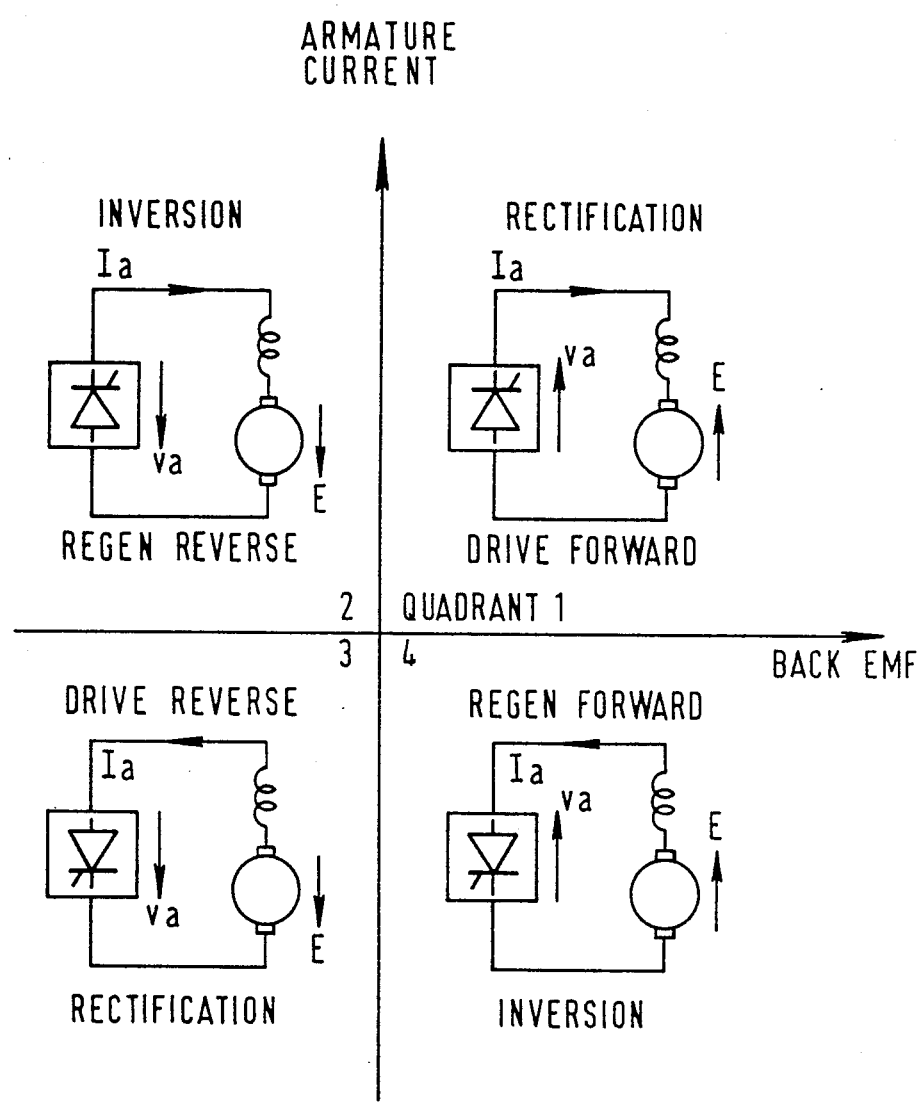
FIG. 2 is a diagram illustrating the availability of control in the four quadrants of the armature current-/back emf domain of a DC electric motor.
Figure 3:
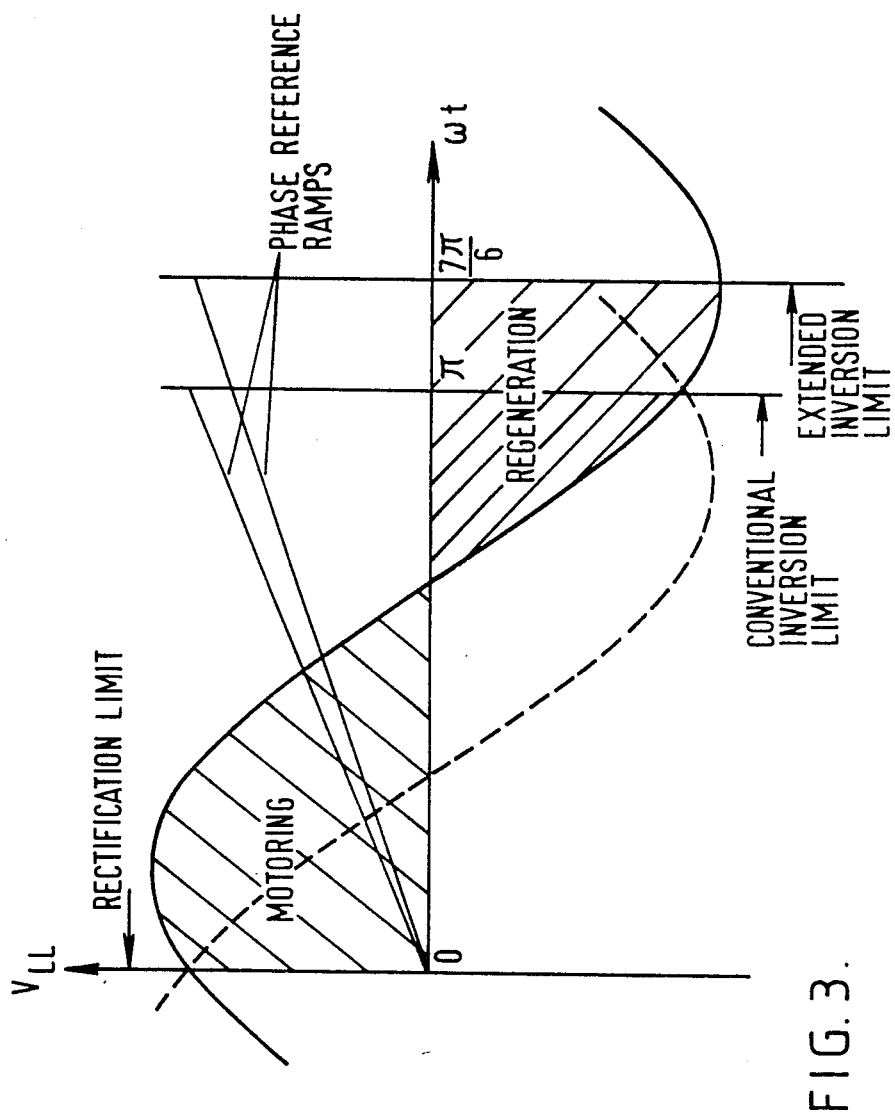
FIG. 3 shows the sinusoidal envelope of the perphase line-to-line potential of a polyphase AC supply.

It will be well understood by those knowledgeable in the art of thyristor phase-controlled polyphase converters that the ability to maintain control of a motor is dependent, inter alia, upon the controllability of current in the thyristor bridge. If, for example, the back emf E of the motor exceeds the maximum instantaneous potential available from the thyristor bridge (as represented by the level $E_1$ shown in FIG. 4), then controlled motor braking is not possible. In practical terms this problem could arise, for example when a motor rated at 400 V is used on a 380 V supply. The resulting back emf E when the motor is in regenerative mode will provide the motive force for uncontrolled current flow, which could be large and destructive. As shown in FIG. 6, the armature of the motor has resistance R and inductance L which will produce an IR voltage drop, and thus the back emf E produced by the motor will be less than the rated armature voltage.

If the magnitude of the back emf of the motor is less than the peak inversion voltage output of the thyristor bridge as represented by the level $E_3$, shown in FIG. 4, for example, then control of armature current is possible in either continuous or discontinuous conduction modes. The rationale for transfer from one phase to the next in order to maintain control of inversion in a braking motor is determined by the suitability of consecutive phases to establish controlled current against the back emf of the motor. When the magnitude of the motor back emf is at the level $E_2$ shown in FIG. 4, then discontinuous current can be produced by the thyristor bridge and control of the motor is achievable.

As previously mentioned herein, various techniques are currently available to those skilled in this art for determining the generation of the six firing signals for the thyristors in the three-phase thyristor bridge of the kind shown in FIG. 1, and for ensuring transfer of conduction from one phase to the next at the conventional inversion limit, and apparatus for achieving this is available from SSD Limited of Littlehampton, West Sussex, England. Implementation of the present invention would only require the detection of zero current at the conventional inversion limit (as modified by source impedance of the three-phase supply) commutation point, whereupon up to a further $\pi/6$ radians of control range would be made available by appropriate modification of the apparatus.

In a microprocessor based embodiment of the invention, for example, an additional conditional path need only be added to the algorithms running in the microprocessor to delay phase transfer when appropriate circumstances are sensed.

In an alternative and well known conventional apparatus manufactured by SSD Limited aforementioned, the terminal voltage of a naturally-commutated, thyristor, phase-controlled, polyphase bridge, such as is shown in FIG. 1, is controlled by converting a control variable (phase angle) representing a point in time relative to the AC supply into a firing event by comparison with a synchronized time variable in the form of an analogue ramp voltage proportional to phase. Phase displacement is defined to be zero at the rectification limit, and in a three-phase implementation there are three time variables (ramps) which are displaced by $\pi/3$ from each other and each span $\pi$ radians before ramp reset at the inversion limit. The control variable (phase angle) is compared with the synchronized time variables and, when equal, the thyristors are fired on a per phase basis. Since phase synchronous timings are always available in such an apparatus, the situation prevailing at the conventional phase transfer point at the inversion limit can readily be made to influence the phase transfer timing in order to modify the conventional apparatus to comply with the principles of the present invention.

Figure 5:
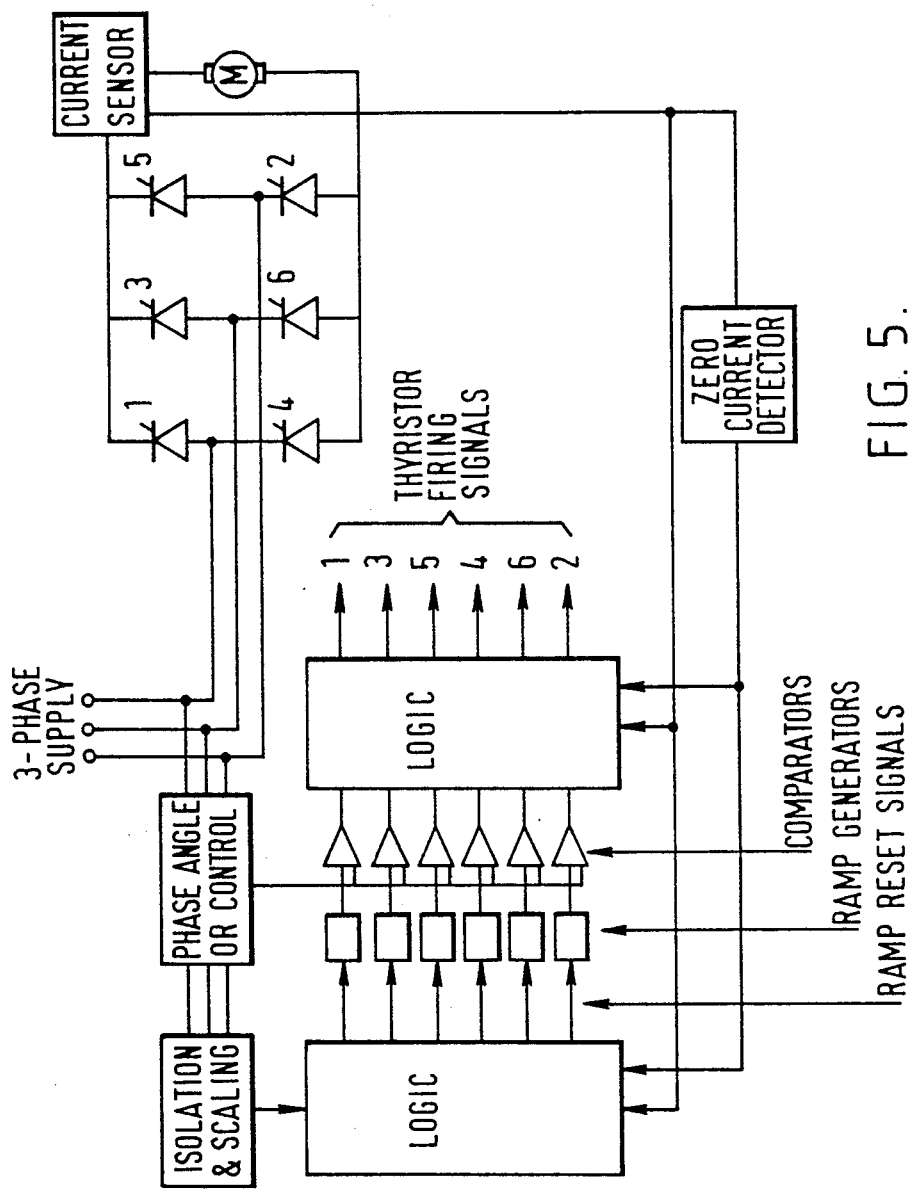
FIG. 5 is a schematic showing of an exemplary embodiment of the present invention.

FIG. 5 of the accompanying drawings schematically illustrates such a generally conventional arrangement incorporating modifications to give effect to the teachings of the present invention. As described above, firing signals to the six thyristors of a three-phase, six-pulse, thyristor converter are developed in dependence upon the relationship between a control voltage and the instantaneous level of ramp voltage waveforms generated in synchronization with the phases of the three-phase supply. The control voltage and the ramp voltage waveforms are conventionally generated, except in that, in accordance with the present invention, a modification is effected when, at the time when phase commutation would conventionally occur at the inversion limit, the load current in the thyristor converter is zero, the modification under these circumstances being such as to extend the range of up to $\pi/6$ radians. The monitoring of load current and the requisite modification can readily be effected by any convenient means, as will be well appreciated by those possessed of the relevant skills. For example, in a microprocessor controlled system, the control range between the rectification limit and the conventional inversion limit would be determined by a hardware/software counter. To modify such a system for operation in accordance with the teachings of the present invention, an extended count period need only be provided, with the software determining when the extended range would be applied as a junction of instantaneous load current.

It is to be noted that, while the conventionally utilized control range for such a polyphase regenerative converter as hereinbefore described is $\pi$ radians electrical, namely, the angular displacement between the rectification and inversion limits, and the present invention proposes in certain circumstances to increase this control range, the increase being from $\pi$ radians to $7\pi/6$ radians for a three-phase system, it is nonetheless to be considered within the scope of the invention to maintain a control range of $\pi$ but to phase shift the control range so as to extend the inversion limit. Thus, the present invention does not require that one limit of the control range be the rectification limit, and only requires that access to the extended control range be allowed when at the conventional inversion limit as modified by end stop considerations the load current was observed to be insignificantly low or zero.

Figure 7:
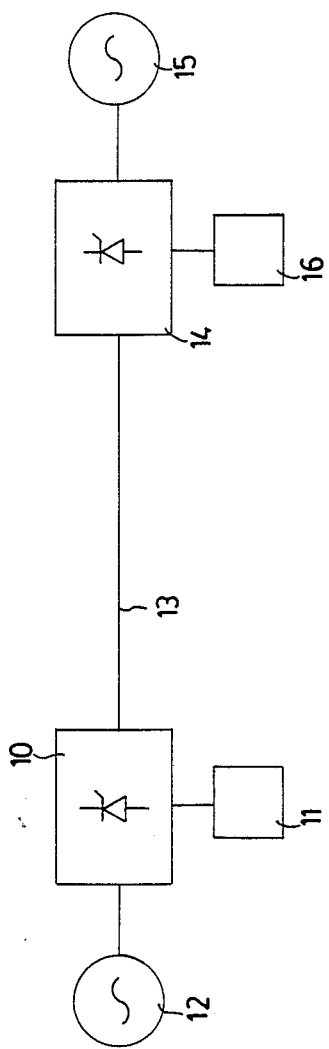
FIG. 7 is a schematic showing a high voltage DC power transmission system.

While the invention has been described herein with particular reference to thyristor converters for DC motors, as previously mentioned herein it will be appreciated by those skilled in the art that the invention has wider application. For example, the invention can be applied to analogous situations with loads other than DC motors. Furthermore, the invention may have application to high voltage DC power transmission applications as, for example, in the load sharing arrangement currently practiced between the electricity distribution authorities in France and the United Kingdom. Power transmission capabilities in such relatively long distance transmission systems are limited firstly by the size and rating of the cable and secondly by the number of variables (such as frequency, phase compatibility, etc.) to be accommodated and, for optimal capacity, DC transmission is employed in preference to AC and a dual thyristor (or equivalent) converter is employed, with one thyristor stack at each end of the transmission line for making the requisite conversions between AC and DC. A high voltage DC power transmission system is shown by way of example in FIG. 7 of the accompanying drawings and comprises a first naturally commutated, phase controlled, polyphase, thyristor converter 10 and associated controller 11 coupled to a first polyphase AC power system 12 and a DC link 13. The DC link 13 provides a high voltage power transmission link to a second naturally commutated, phase controlled, polyphase thyristor converter 14 coupled to a second polyphase AC power system 15 and controlled by its own associated controller 16. The present invention can be applied to such converters in such applications, and could enable up to 15% more power to be transmitted over the same line.

We claim:

1. A polyphase AC/DC converter comprising controlled rectifier devices and phase-dependent commutation control means associated therewith for transferring conduction between the controlled rectifier devices, the commutation control means comprising rectifier controlling means operative under load current for controlling the respective controlled rectifier devices within a control range, and limiting means for limiting said control range by an inversion limit beyond which commutation will not successfully transfer conduction from one phase to the next, wherein the commutation control means further comprises load detecting means for detecting a condition of instantaneous zero load current and means responsive to such detection for extending the control range limit by no greater than $\pi/2p$ radians from the inversion limit, where $p \geq 3$ denotes the number of phases.

2. A polyphase AC/DC converter comprising a naturally-commutated, phase-controlled, polyphase thyristor bridge, control means operative under load current conditions to determine the commutation of the thyristors in the bridge, and limiting means for limiting the operation of said control means to within a control range limited by an inversion limit beyond which commutation will not successfully transfer conduction from one phase to the next, wherein the control means comprises converter load current detecting means, and means responsive to a detected zero converter load current situation prevailing at a time when the control means is operative in the inversion mode of the bridge for (a) inhibiting the operation of said limiting means so as to inhibit phase transfer at the inversion limit and (b) delaying phase transfer for a predetermined further limited period while maintaining control.

3. A polyphase AC/DC converter according to claim 2, wherein the predetermined further limited period does not exceed $\pi/2p$ radians, $p \geq 3$ denoting the number of phases.

4. A polyphase AC/DC converter according to claim 2, wherein the control range is predetermined and fixed, and said control means is operative in dependence on said load current detecting means under load current conditions, such that the control range is defined as predetermined fixed range between the rectification limit of the converter and the inversion limit, and said means responsive to a detected zero load current situation causes said predetermined fixed range to be shifted so as to terminate at the extended inversion limit.

5. A polyphase AC/DC converter according to claim 4, wherein said predetermined fixed control range comprises $\pi$ radians.

6. A polyphase AC/DC converter according to claim 1 in combination with a DC motor.

7. A polyphase AC/DC converter according to claim 6, wherein the phase transfer deferment facility of the converter is effective under regenerative conditions of the DC motor.

8. A polyphase AC/DC converter according to claim 1, incorporated into a power-sharing electrical power distribution system.

9. A power-sharing electrical power distribution system comprising a first naturally-commutated, phase-controlled, polyphase, thyristor AC/DC converter at a first location, said first AC/DC converter being coupled to a first polyphase AC power system and to a DC link, and a second naturally-commutated, phase-controlled, polyphase, thyristor AC/DC converter at a second location remote from said first location, said second AC/DC converter being coupled to a second polyphase AC power system and to said DC link, wherein each of said first and second converters comprises rectifier controlling means including limiting means defining an inversion limit which is observed for successful transfer of conduction between phases, load current detecting means for detecting conditions of zero load current, means for extending the range of and control of said rectifier controlling means beyond the inversion limit.

* * * * *